(12) United States Patent
Maeda et al.

(10) Patent No.: US 10,750,054 B2
(45) Date of Patent: Aug. 18, 2020

(54) IMAGE SCANNER

(71) Applicant: BROTHER KOGYO KABUSHIKI KAISHA, Nagoya-shi, Aichi-ken (JP)

(72) Inventors: Atsushi Maeda, Nagoya (JP); Takahiro Ikeno, Seto (JP)

(73) Assignee: BROTHER KOGYO KABUSHIKI KAISHA, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/254,759

(22) Filed: Jan. 23, 2019

(65) Prior Publication Data

US 2019/0230251 A1    Jul. 25, 2019

(30) Foreign Application Priority Data

Jan. 25, 2018    (JP) .................................. 2018-010321

(51) Int. Cl.
| | |
|---|---|
| *H04N 1/00* | (2006.01) |
| *H04N 1/48* | (2006.01) |
| *H04N 1/03* | (2006.01) |
| *H04N 1/028* | (2006.01) |

(52) U.S. Cl.
CPC .......... *H04N 1/484* (2013.01); *H04N 1/0281* (2013.01); *H04N 1/03* (2013.01)

(58) Field of Classification Search
CPC .......... H04N 1/04; H04N 1/484; H04N 1/486; H04N 1/48; H04N 1/0281; H04N 1/02865; H04N 1/03; H04N 1/0306; H04N 1/0311; H04N 1/1043; H04N 1/193

USPC .......... 358/1.9, 2.1, 406, 505, 509, 514, 515
See application file for complete search history.

(56) References Cited

U.S. PATENT DOCUMENTS

| | | | |
|---|---|---|---|
| 2008/0002901 A1* | 1/2008 | Miyagi | ...................... G06T 5/20 382/260 |
| 2008/0123152 A1* | 5/2008 | Goto | ...................... G06K 15/02 358/3.27 |
| 2008/0231877 A1* | 9/2008 | Ono | ...................... H04N 1/484 358/1.9 |
| 2010/0296141 A1* | 11/2010 | Maruyama | ......... H04N 1/02865 358/509 |
| 2016/0248937 A1* | 8/2016 | Matsuki | ................ H04N 1/486 |

(Continued)

FOREIGN PATENT DOCUMENTS

| | | |
|---|---|---|
| JP | 2000-224375 A | 8/2000 |
| JP | 2000-261605 A | 9/2000 |

(Continued)

*Primary Examiner* — Chad Dickerson
(74) *Attorney, Agent, or Firm* — Scully, Scott, Murphy & Presser, P.C.

(57) ABSTRACT

First, second, and third line reading processing is processing of emitting light of each color to first, second, and third line of an original document in first, second, and third lighting order, respectively, and reading reflection light of the emitted light. A color that is first in the first lighting order, a color that is first in the second lighting order, and a color that is first in the third lighting order are different from each other. A color that is second in the first lighting order, a color that is second in the second lighting order, and a color that is second in the third lighting order is different from each other. A color that is third in the first lighting order, a color that is third in the second lighting order, and a color that is third in the third lighting order is different from each other.

6 Claims, 10 Drawing Sheets

(56) References Cited

U.S. PATENT DOCUMENTS

2017/0331984 A1* 11/2017 Akagi .................. H04N 1/40
2018/0324317 A1* 11/2018 Akagi .................. H04N 1/028

FOREIGN PATENT DOCUMENTS

JP      2016-151893 A    8/2016
JP      2017-034553 A    2/2017

* cited by examiner

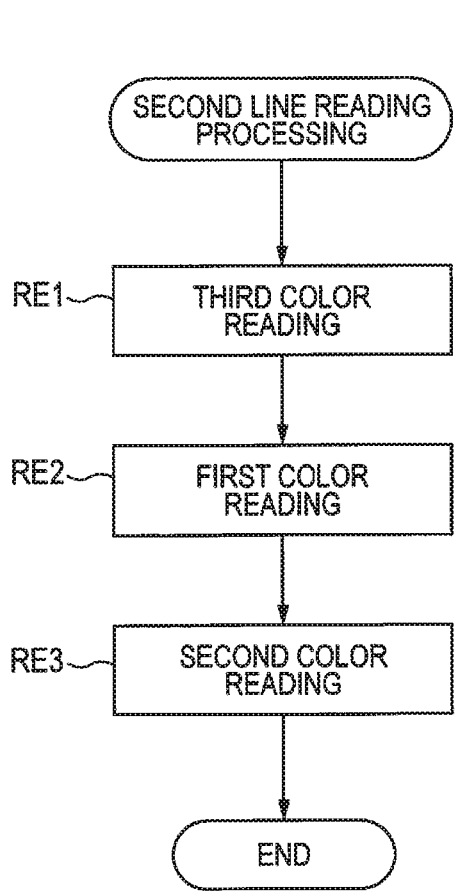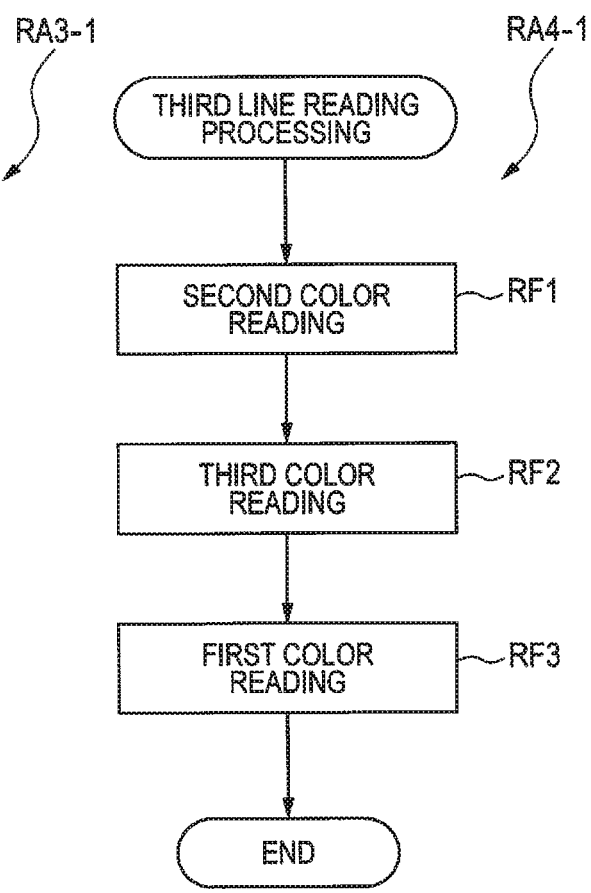

IMAGE SCANNER

CROSS REFERENCE TO RELATED APPLICATIONS

This application claims priority from Japanese Patent Application No. 2018-010321 filed Jan. 25, 2018. The entire content of the priority application is incorporated herein by reference.

TECHNICAL FIELD

This disclosure relates to an image scanner.

BACKGROUND

There is known an image scanner that emits light of red, green and blue in a lighting order of respective colors, that moves, in a sub-scanning direction, a reader having a line sensor extending in a main scanning direction, and that reads an image on an original document for each scanning line of red, green and blue.

When reading a monochromatic or intermediate color image with gradations, a known image scanner reads the image on the original document by emitting light alternately between a first lighting order in which light of red, green, and blue is emitted in this order and a second lighting order that is opposite to the first lighting order (that is, the order of blue, green, and red), in order to prevent the occurrence of coloring to a particular color.

SUMMARY

According to one aspect, this specification discloses an image scanner. The image scanner includes a light source, a line sensor, a mover, and a circuit. The light source is configured to emit light of each of three colors of red, blue, and green. The line sensor extends in a main scanning direction and is configured to read reflection light of the light of each color emitted from the light source. The mover is configured to change a relative position of the line sensor relative to an original document in a sub-scanning direction perpendicular to the main scanning direction. The circuit is configured to repeat a set of first line reading processing, second line reading processing, and third line reading processing. The first line reading processing, the second line reading processing, and the third line reading processing are performed in this order in each set. The first line reading processing is processing of emitting, from the light source, light of each of the three colors to a first line of the original document in a first lighting order and reading, with the line sensor, reflection light of the light of each color emitted in the first lighting order. The first line is a particular line of the original document. The second line reading processing is processing of emitting, from the light source, light of each of the three colors to a second line of the original document in a second lighting order and reading, with the line sensor, reflection light of the light of each color emitted in the second lighting order. The second line is adjacent to the first line at a downstream side thereof in the sub-scanning direction. The third line reading processing is processing of emitting, from the light source, light of each of the three colors to a third line of the original document in a third lighting order and reading, with the line sensor, reflection light of the light of each color emitted in the third lighting order. The third line is adjacent to the second line at a downstream side thereof in the sub-scanning direction. A color that is first in the first lighting order, a color that is first in the second lighting order, and a color that is first in the third lighting order are different from each other. A color that is second in the first lighting order, a color that is second in the second lighting order, and a color that is second in the third lighting order is different from each other. A color that is third in the first lighting order, a color that is third in the second lighting order, and a color that is third in the third lighting order is different from each other.

BRIEF DESCRIPTION OF THE DRAWINGS

Embodiments in accordance with this disclosure will be described in detail with reference to the following figures wherein:

FIG. 11 is a flowchart showing second line reading processing RA3-1 according to the second embodiment;

FIG. 12 is a flowchart showing third line reading processing RA4-1 according to the second embodiment.

DETAILED DESCRIPTION

However, if an interval between dots forming the image on the original document is close to a reading interval in the sub-scanning direction, coloring to a particular color occurs even with the above-described image scanner. For example, assume a case where the first lighting order is the order of red, green and blue, the second lighting order is the order of blue, green and red, and the original document to be read has black dots from when the green light in the first lighting order is turned on until the green light in the second lighting order is turned on. In this case, when the image scanner first turns on red light in the first lighting order no black dot is present. Also, when the image scanner last turns on red light in the second lighting order, no black dot is present. That is, in a scanning line emitted in the first lighting order and a scanning line emitted in the second lighting order, no black dot is present when red light is turned on. Thus, coloring to red may occur.

In view of the foregoing, an aspect of an objective of this disclosure is to provide an image scanner configured to suppress occurrence of coloring to a particular color.

First Embodiment

Figure 1:
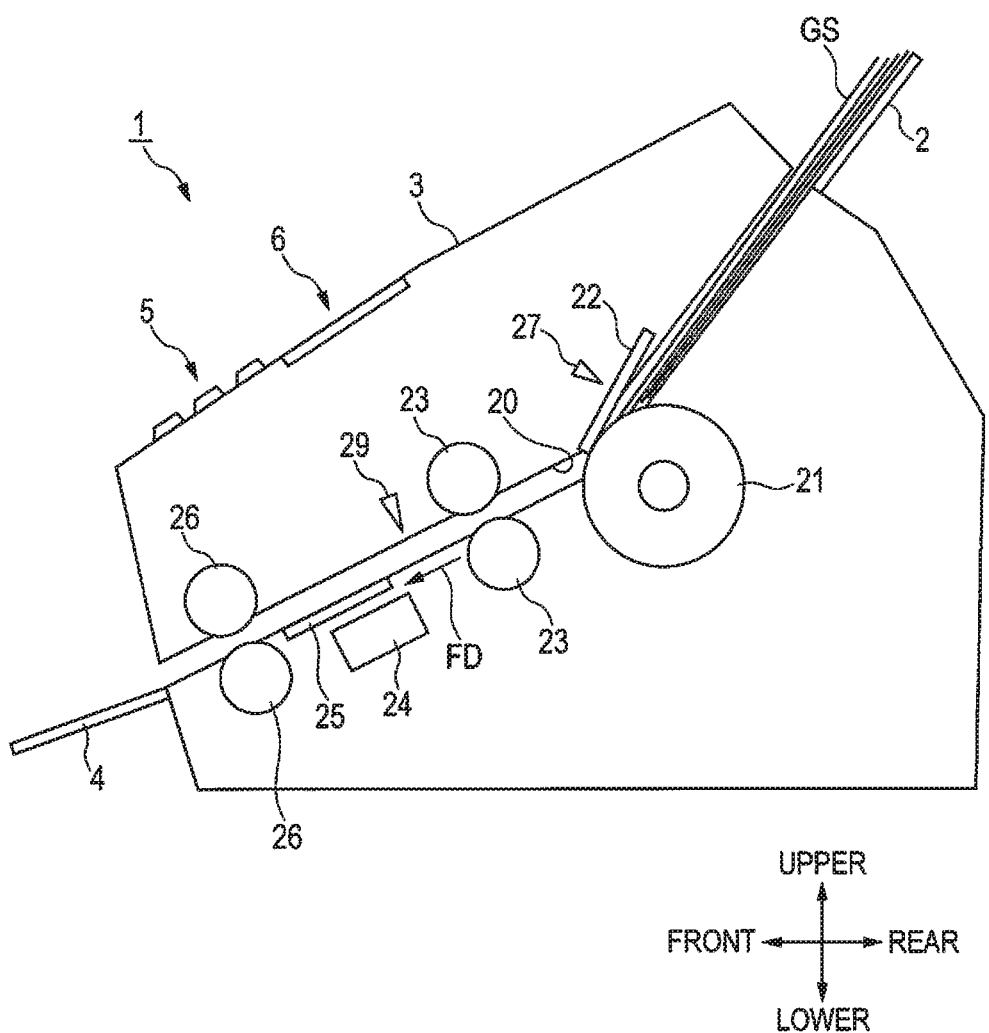
FIG. 1 is a schematic diagram showing an internal configuration of an image scanner 1.

An image scanner 1 of a first embodiment will be described while referring to the attached drawings. In FIG. 1, an upper-lower direction and a front-rear direction are indicated by the arrows. A conveyance direction FD is indicated by the arrows in FIG. 1 and FIG. 2. A main scanning direction MD is indicated by the arrow in FIG. 3.

<Mechanical Configuration of Image Scanner 1>

In FIG. 1, the image scanner 1 includes a paper feed tray 2, a main body 3, and a paper discharge tray 4. An operation interface 5 and a display 6 are disposed on an upper surface of the main body 3. The operation interface 5 includes a power switch and various setting buttons and receives an operation instruction and so on from a user. For example, the operation interface 5 includes a start button that instructs start of a reading operation. The display 6 includes an LCD and displays the status of the image scanner 1. An original document GS is placed on a support surface of the paper feed tray 2.

A conveyance path 20 is formed inside the main body 3. The original document GS supported on the paper feed tray 2 is conveyed along the conveyance path 20 in a conveyance direction FD and discharged to the paper discharge tray 4. A paper feed roller 21, a separating pad 22, a pair of upstream-side conveyance rollers 23, a rear sensor 29, a reader 24, a platen glass 25, and a pair of downstream-side conveyance rollers 26 are disposed along the conveyance path 20.

The paper feed roller 21 cooperates with the separating pad 22 to feed a plurality of original documents GS one sheet at a time. The paper feed roller 21, the upstream-side conveyance rollers 23, and the downstream-side conveyance rollers 26 are driven by a conveyance motor MT (see FIG. 4). The rear sensor 29 is provided between the upstream-side conveyance rollers 23 and the reader 24. The rear sensor 29 turns on when the original document GS passes a position at which the rear sensor 29 is provided and turns off when the original document GS does not pass the position at which the rear sensor 29 is provided. In this embodiment, the rear sensor 29 is disposed at a position separated from the reader 24 by a particular distance upstream in the conveyance direction FD. The platen glass 25 is transparent and is disposed along the conveyance path 20 at a lower side of the conveyance path 20. The conveyance rollers 23 and 26 convey the original document GS fed from the paper feed roller 21 so that the original document GS passes over the platen glass 25.

In this embodiment, the original document GS is supported by the paper feed tray 2 so that a reading surface of the original document GS faces the support surface of the paper feed tray 2. The reader 24 is disposed at the lower side of the conveyance path 20 and reads an image on the reading surface of the original document GS that passes the platen glass 25. A front sensor 27 is provided at the paper feed tray 2. The front sensor 27 turns on when the original document GS is supported by the paper feed tray 2 and turns off when the original document GS is not supported by the paper feed tray 2.

<Detailed Configuration of Reader 24>

Figure 2:
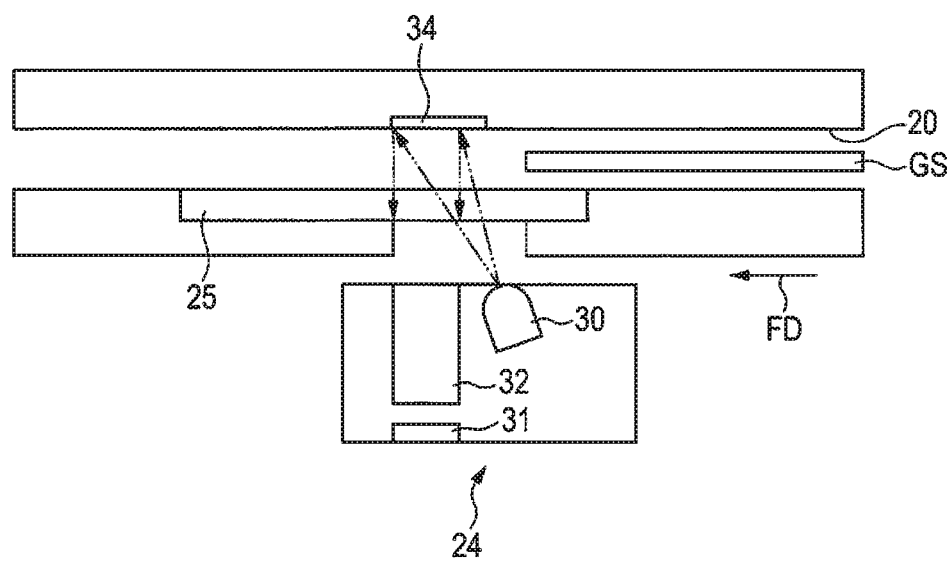
FIG. 2 is an enlarged view showing a configuration of a reader 24 of the image scanner 1.

A detailed configuration of the reader 24 is described with reference to FIGS. 2 and 3. In FIG. 2, the reader 24 includes a light source 30, a light receiver 31, and a rod lens array 32. The light source 30 includes red, green and blue light emitting diodes. When light emitted from the light source 30 is reflected on the reading surface of the original document GS and so on, the rod lens array 32 forms an image with the reflected light on the light receiver 31. In this embodiment, light emitting diodes of three colors are sequentially turned on so that an image of one line of the original document GS is read. The light source 30 includes one-chip light emitting diode provided with the light emitting diodes of three colors and a light-guiding body that guides the light emitted from the light emitting diodes in the main scanning direction MD.

A white reference plate 34 is disposed at a position facing the reader 24 through the conveyance path 20. The white reference plate 34 has a reflectance equal to that of white color which is a background color of the original document GS. When the original document GS is not present on the conveyance path 20, the light emitted from the light source 30 is reflected on the white reference plate 34 and received by the light receiver 31 through the rod lens array 32.

Figure 3:
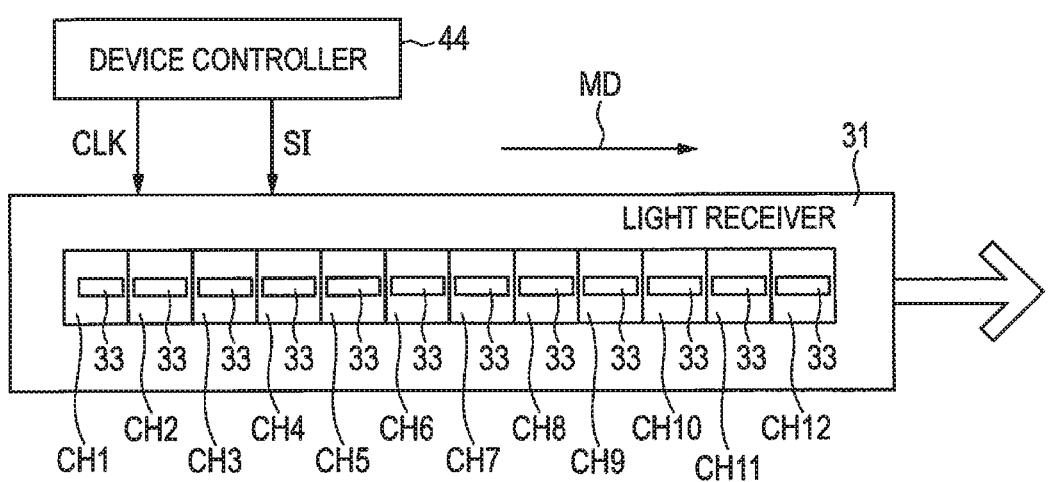
FIG. 3 is a block diagram showing a configuration of a light receiver 31 of the reader 24.

In FIG. 3, the light receiver 31 includes twelve sensor IC chips CH1 to CH12 (hereinafter referred to as "chips CH1 to CH12") arranged linearly in the main scanning direction MD, and an analog shift register (not shown). Each of the chips C1 to C12 includes a large number of photoelectric conversion elements 33 arranged in the main scanning direction MD. The amount of light received by each photoelectric conversion element 33 is stored as charge and output to the analog shift register as an electrical signal for each pixel. The analog shift register is configured to store the same number of electrical signals for pixels as the number of photoelectric conversion elements 33. Each photoelectric conversion element 33 is connected to a corresponding register of the analog shift register. The electrical signals output from the analog shift register are output as analog signals through an amplifier (not shown). An initial pixel is a pixel that is read by an initial element located at the end (at the side not adjacent to the chip CH2) of the chip CH1 located most upstream in the main scanning direction MD. A final pixel is a pixel that is read by a final element located at the end (at the side not adjacent to the chip CH11) of the chip C12 located most downstream in the main scanning direction MD. One line is a group of pixels from the initial pixel to the final pixel.

<Electrical Configuration of Image Scanner 1>

Figure 4:
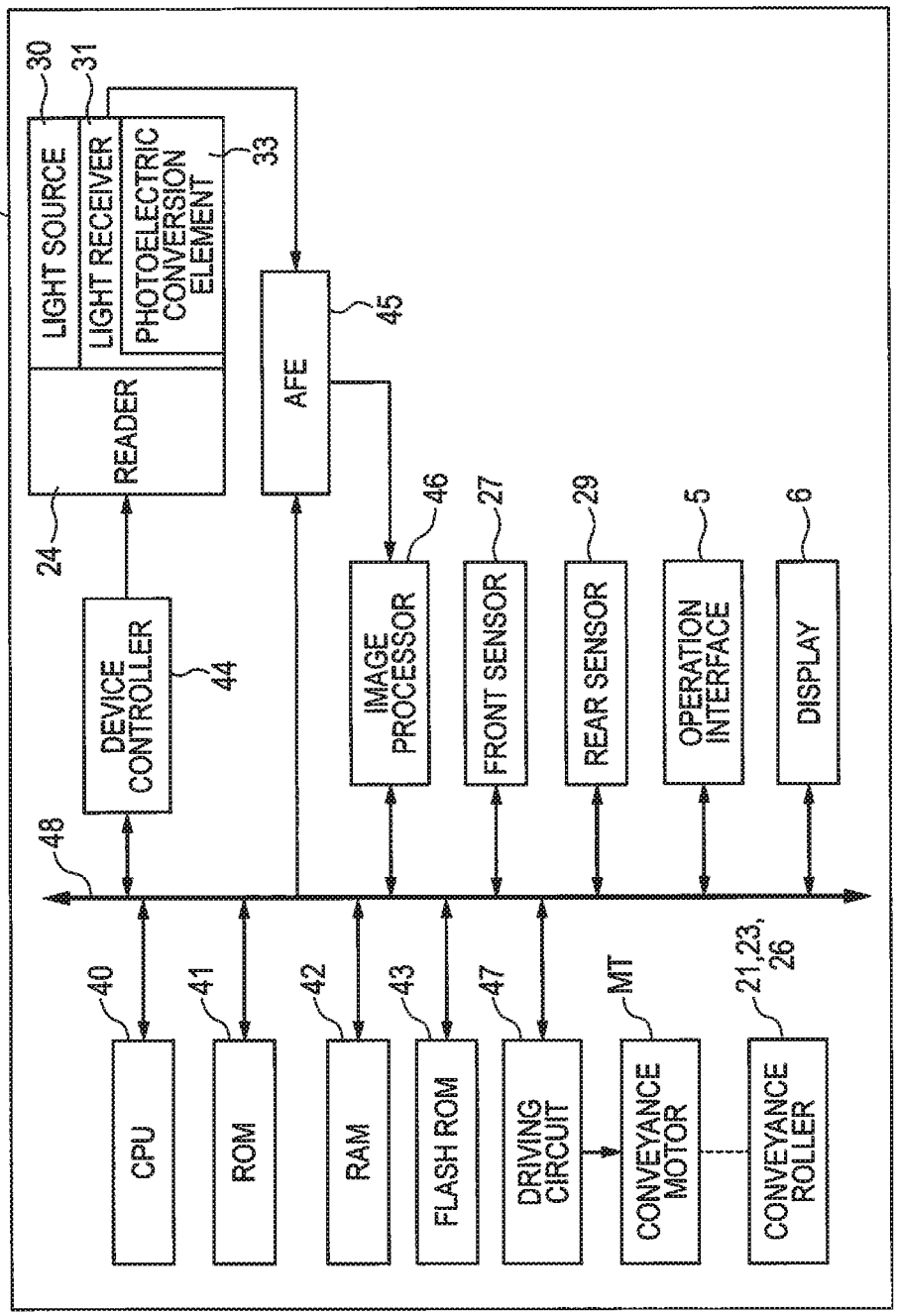
FIG. 4 is a block diagram showing an electrical configuration of the image scanner 1.

The electrical configuration of the image scanner 1 will be described with reference to FIG. 4. In FIG. 4, the image scanner 1 includes, as main constituent elements, a CPU 40, a ROM 41, a RAM 42, a flash ROM 43, a device controller 44, an analog front end (hereinafter referred to as an AFE) 45, an image processor 46, and a driving circuit 47. These constituent elements are connected to the operation interface 5, the display 6, the front sensor 27, and the rear sensor 29 through a bus 48.

The ROM 41 stores programs for allowing the image scanner 1 to execute various operations such as reading main processing described later and subroutine processing in the reading main processing. The CPU 40 controls the respective units in accordance with programs read out from the ROM 41. The flash ROM 43 is a reprogrammable nonvolatile memory, and stores various data used by control processing by the CPU 40, for example, various data that are used for initialization. The RAM 42 temporarily stores, for example, the calculation results generated by control processing by the CPU 40.

The device controller 44 is connected to the reader 24. Based on a command from the CPU 40, the device controller 44 transmits, to the light source 30, a signal for controlling light-on or light-off of the light source 30 and a signal for controlling a current value of electric current that flows through the light source 30. As shown in FIG. 3, based on a command from the CPU 40, the device controller 44 transmits a serial-in signal SI and a clock signal CLK to the light receiver 31. The serial-in signal SI is a signal for concurrently transferring electric signals of a large number of the photoelectric conversion elements 33 of each chip CH1 to CH12 of the light receiver 31 to each register of the analog shift register. The clock signal CLK is a signal for sequentially outputting electric signals of the analog shift register one pixel at a time. In response to receiving these control signals from the device controller 44, the reader 24 turns on the light source 30 and transmits, to the AFE 45, an analog signal depending on the amount of light received by the light receiver 31.

The AFE 45 is connected to the reader 24, and converts an analog signal transmitted from the reader 24 into digital data based on an instruction from the CPU 40. The AFE 45 has a particular input range and resolution. For example, the resolution of 10 bits corresponds to gradations from "0" to "1023". In this case, the AFE 45 converts an analog signal transmitted from the reader 24 into gradation data of 10 bits (0 to 1023) as the digital data. The digital data converted by the AFE 45 is transmitted to the image processor 46.

The image processor 46 is configured by an ASIC that is an IC dedicated to image processing, and performs various image processing on digital data. The image processing includes correction processing such as shading correction and gamma correction. The image processor 46 performs image processing on digital data to generate digital image data. The digital image data is stored in the RAM 42 through the bus 48.

The driving circuit 47 is connected to a conveyance motor MT, and drives the conveyance motor MT based on a drive command transmitted from the CPU 40. The driving circuit 47 rotates the conveyance motor MT in accordance with a rotation amount and a rotation direction commanded by a drive command. When the conveyance motor MT rotates by a particular amount, the paper feed roller 21 and the conveyance rollers 23, 26 rotate by a particular angle to convey the original document GS by a particular distance in the conveyance path 20.

<Operation of Image Scanner in First Embodiment>

Next, the operation of the image scanner 1 in the first embodiment will be described with reference to the accompanying drawings. The image scanner 1 mainly executes reading main processing of reading the original document GS. Processing R1 to processing R5 in the reading main processing and processing of each subroutine are executed by the CPU 40.

<Reading Main Processing>

Figure 5:
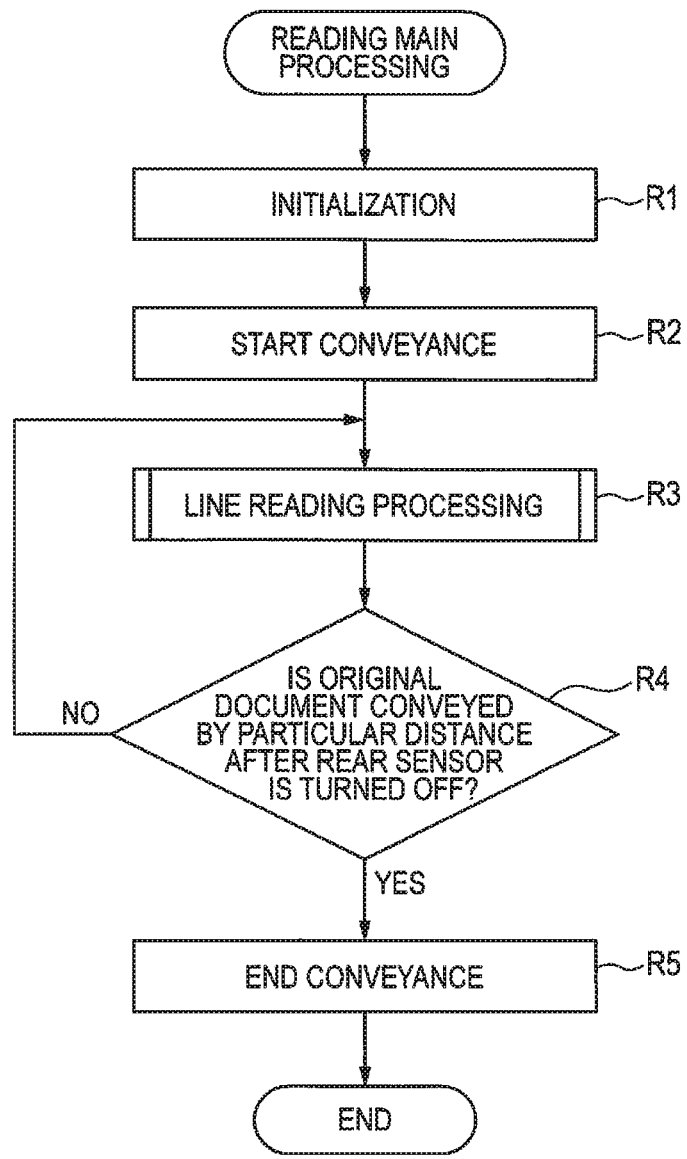
FIG. 5 is a flowchart showing reading main processing.

The reading main processing shown in FIG. 5 starts when a user places the original document GS on the paper feed tray 2 and presses a reading start button on the operation interface 5. In other words, in response to receiving a reading start command from the operation interface 5 when the front sensor 27 is ON, the CPU 40 starts the reading main processing. In this embodiment, a color reading operation of reading red, green and blue is executed in the reading main processing.

The CPU 40 initializes the device controller 44, the AFE 45, the image processor 46, and so on (R1). More specifically, in the processing R3, the CPU 40 sets, to the device controller 44, the AFE 45, and the image processor 46, setting values required for executing the color reading operation at a resolution of 300 DPI in the main scanning direction MD and 300 DPI in the conveyance direction FD. The CPU 40 sets a line count value LCV to "1".

The CPU 40 starts a conveyance operation of the original document GS (R2). More specifically, the CPU 40 starts an operation of transmitting a drive command to the driving circuit 47 and conveys the leading end of the original document GS to a reading start position. The reading start position is a position separated from the position of the rear sensor 29 downstream in the conveyance direction FD by a particular distance. In this embodiment, the CPU 40 continues the operation of transmitting a drive command to the driving circuit 47 even after the leading end of the original document GS has been conveyed to the reading start position.

The CPU 40 executes line reading processing (R3). Details of this processing are described later, and hence only a summary is given here. The CPU 40 executes first line read processing, second line reading processing, or third line reading processing based on the line count value LCV.

The CPU 40 determines whether the original document GS has been conveyed by a particular distance from the time at which the rear sensor 29 is turned off (R4). More specifically, if the CPU 40 has transmitted the drive command for conveying the original document GS by the particular distance from the time at which the rear sensor 29 is turned off (R4: Yes), the CPU 40 determines that the original document GS has been conveyed by the particular distance from the time at which the rear sensor 29 is turned off, and proceeds to the processing R5. If the CPU 40 has not transmitted the drive command for conveying the original document GS by the particular distance from the time at which the rear sensor 29 is turned off (R4: No), the CPU 40 determines that the original document GS has not been conveyed by the particular distance from the time at which the rear sensor 29 is turned off, and returns to the processing R3. In this embodiment, the color reading operation is executed by repeating the processing R3 and R4. When the processing R3 and the processing R4 are executed, the CPU 40 repeatedly transmits the drive command. When the processing R3 and processing R4 are executed once, the original document GS is conveyed by a distance corresponding to the reading interval at 300 DPI.

The CPU 40 ends the conveyance operation of the original document GS (R5). More specifically, the CPU 40 transmits the drive command to discharge the original document GS to the paper discharge tray 4. The reading main processing ends when the processing R5 ends.

<Line Reading Processing R3>

Figure 6:
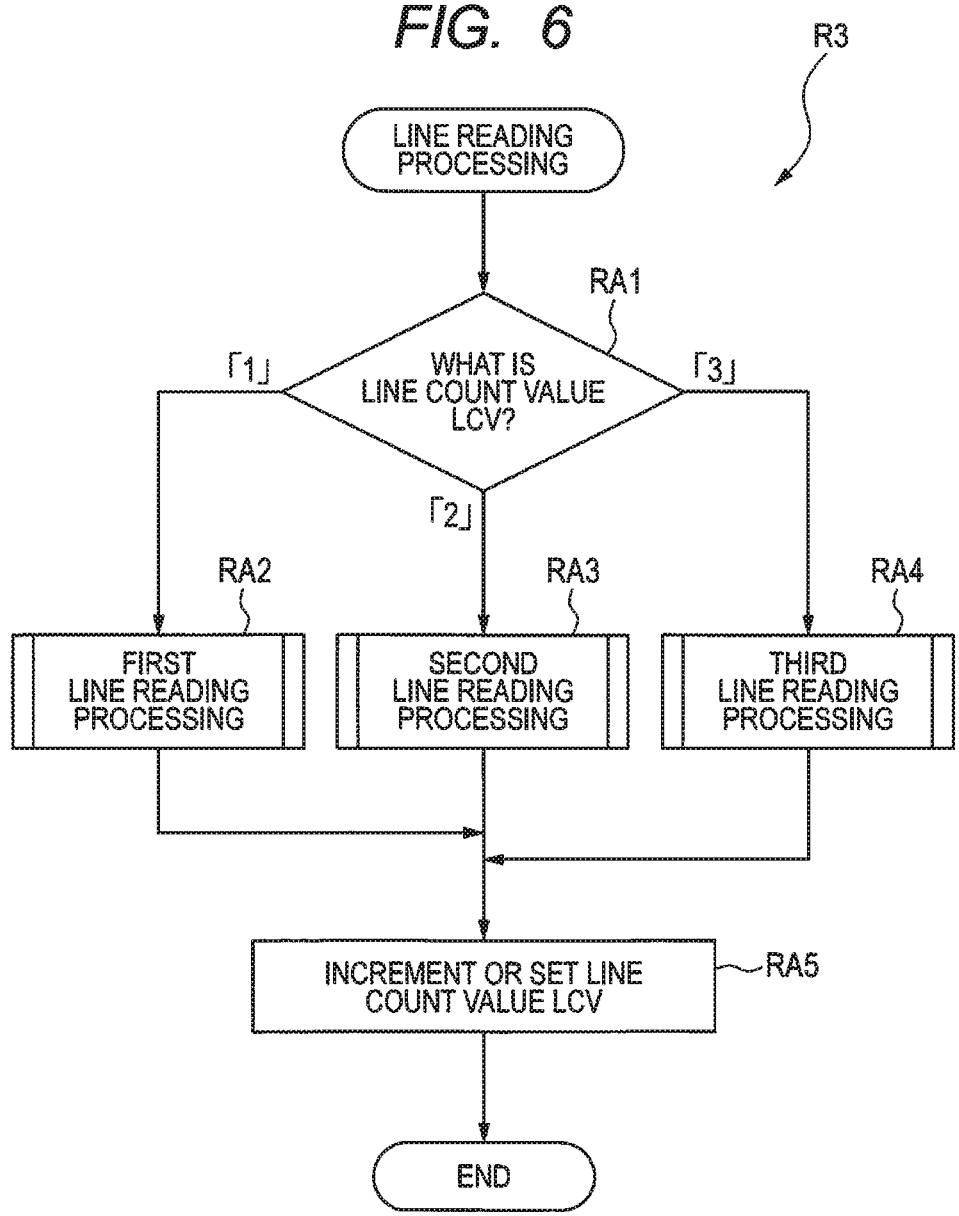
FIG. 6 is a flowchart showing line reading processing R3.

Upon starting the line reading processing R3 shown in FIG. 6, the CPU 40 determines whether the line count value LCV is "1", "2" or "3" (RA1). When the line count value LCV is "1" (RA1: "1"), the CPU 40 proceeds to processing RA2. When the line count value LCV is "2" (RA1: "2"), the CPU 40 proceeds to processing RA3. When the line count value LCV is "3" (RA1: "3"), the CPU 40 proceeds to processing RA4.

When it is determined that the line count value LCV is "1" in the processing RA1, the CPU 40 executes the first line reading processing (RA2). Details of this processing are described later, and hence only a summary is given here. The CPU 40 sequentially executes first color reading processing, second color reading processing, and third color reading processing. When the processing RA2 ends, the CPU 40 proceeds to the processing RA5.

When it is determined that the line count value LCV is "2" in the processing RA1, the CPU 40 executes the second line reading processing (RA3). Details of this processing are described later, and hence only a summary is given here. The CPU 40 sequentially executes the second color reading processing, the third color reading processing, and the first color reading processing. When the processing RA3 ends, the CPU 40 proceeds to the processing RA5.

When it is determined that the line count value LCV is "3" in the processing RA1, the CPU 40 executes the third line reading processing (RA4). Details of this processing are described later, and hence only a summary is given here. The CPU 40 sequentially executes the third color reading processing, the first color reading processing, and the second color reading processing. When the processing RA4 ends, the CPU 40 proceeds to the processing RA5.

When the processing RA2, the processing RA3 or the processing RA4 ends, the CPU 40 adds "1" to the line count value LCV when the line count value LCV is "1" or "2" and sets the line count value LCV to "1" when the line count value LCV is "3" (RA5). When the processing RA5 ends, the line reading processing R3 ends.

<First Line Reading Processing RA2>

Figure 7:
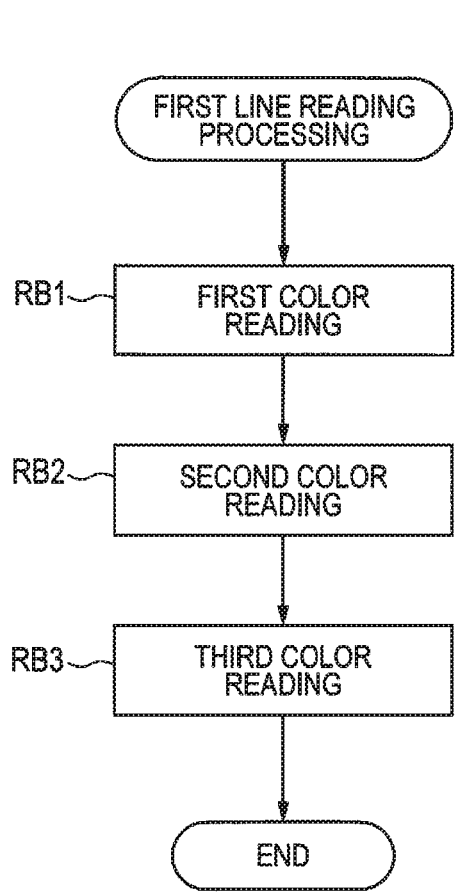
FIG. 7 is a flowchart showing first line reading processing RA2 according to first and second embodiments.

Upon starting the first line reading processing RA2 shown in FIG. 7, the CPU 40 executes the first color reading processing (RB1). More specifically, the CPU 40 controls the device controller 44 to emit light of a first color from the light source 30 to the original document GS and acquires digital image data of the first color by reading the light reflected from the original document GS. The first color is one of red, green and blue. In this embodiment, the light of the first color is red light.

The CPU 40 executes the second color reading processing (RB2). More specifically, the CPU 40 controls the device controller 44 to emit light of a second color from the light source 30 to the original document GS and acquires digital image data of the second color by reading the light reflected from the original document GS. The second color is one of two remaining colors that are obtained by excluding the first color from red, green and blue. In this embodiment, the light of the second color is green light.

The CPU 40 executes the third color reading processing (RB3).

More specifically, the CPU 40 controls the device controller 44 to emit light of a third color from the light source 30 to the original document GS and acquires digital image data of the third color by reading the light reflected from the original document GS. The third color is the remaining color that is obtained by excluding the first color and the second color from red, green and blue. When the processing RB3 ends, the processing RA2 ends. In this embodiment, the light of the third color is blue light. The digital image data of the first color acquired in the processing RB1, the digital image data of the second color acquired in the processing RB2, and the digital image data of the third color acquired in the processing RB3 are combined to form digital image data of one line.

<Second Line Reading Processing RA3>

Figure 8:
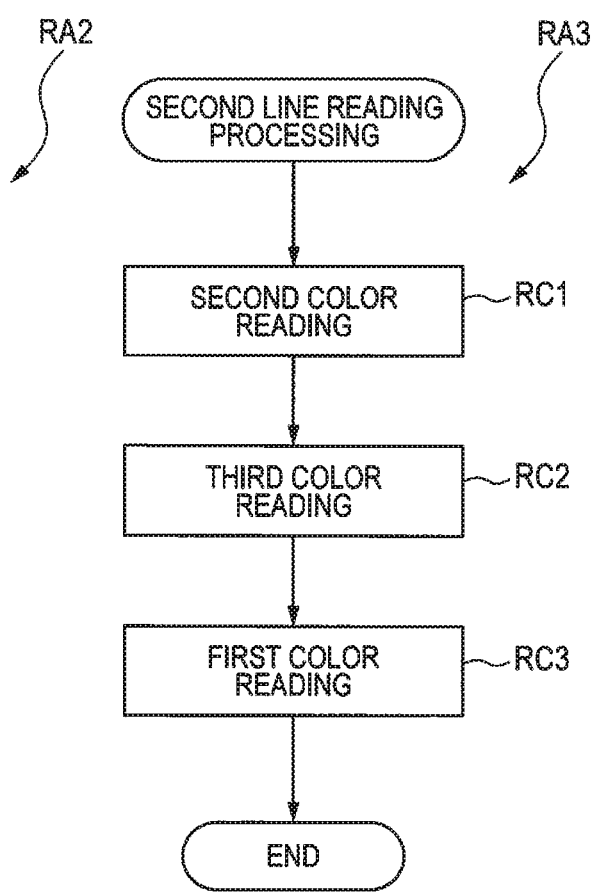
FIG. 8 is a flowchart showing second line reading processing RA3 according to the first embodiment.

Upon starting the second line reading processing RA3 shown in FIG. 8, the CPU 40 executes the second color reading processing (RC1). More specifically, the CPU 40 controls the device controller 44 to emit light of the second color from the light source 30 to the original document GS and acquires the digital image data of the second color by reading the light reflected from the original document GS. In this embodiment, the light of the second color is green light as mentioned above.

The CPU 40 executes the third color reading processing (RC2). More specifically, the CPU 40 controls the device controller 44 to emit light of the third color from the light source 30 to the original document GS and acquires the digital image data of the third color by reading the light reflected from the original document GS. In this embodiment, the light of the third color is blue light as mentioned above.

The CPU 40 executes the first color reading processing (RC3). More specifically, the CPU 40 controls the device controller 44 to emit light of the first color from the light source 30 to the original document GS and acquires the digital image data of the first color by reading the light reflected from the original document GS. When the processing RC3 ends, the processing RA3 ends. In this embodiment, the light of the first color is red light as mentioned above. The digital image data of the second color acquired in the processing RC1, the digital image data of the third color acquired in the processing RC2, and the digital image data of the first color acquired in the processing RC3 are combined to form digital image data of one line.

<Third Line Reading Processing RA4>

Figure 9:
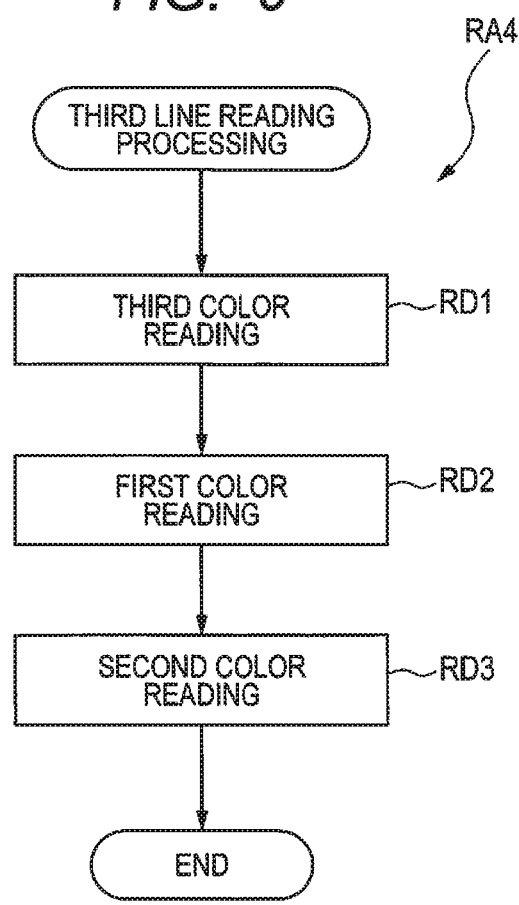
FIG. 9 is a flowchart showing third line reading processing RA4 according to the first embodiment.

Upon starting the third line reading processing RA4 shown in FIG. 9, the CPU 40 executes the third color reading processing (RD1). More specifically, the CPU 40 controls the device controller 44 to emit light of the third color from the light source 30 to the original document GS and acquires the digital image data of the third color by reading the light reflected from the original document GS. In this embodiment, the light of the third color is blue light as mentioned above.

The CPU 40 executes the first color reading processing (RD2). More specifically, the CPU 40 controls the device controller 44 to emit light of the first color from the light source 30 to the original document GS and acquires the digital image data of the first color by reading the light reflected from the original document GS. In this embodiment, the light of the first color is red light as mentioned above.

The CPU 40 executes the second color reading processing (RD3). More specifically, the CPU 40 controls the device controller 44 to emit light of the second color from the light source 30 to the original document GS and acquires the digital image data of the second color by reading the light reflected from the original document GS. When the processing RD3 ends, the processing RA4 ends. In this embodiment, the light of the second color is green light as mentioned above. The digital image data of the third color acquired in the processing RD1, the digital image data of the first color acquired in the processing RD2, and the digital image data of the second color acquired in the processing RD3 are combined to form digital image data of one line.

Specific Example of First Embodiment

Figure 10:
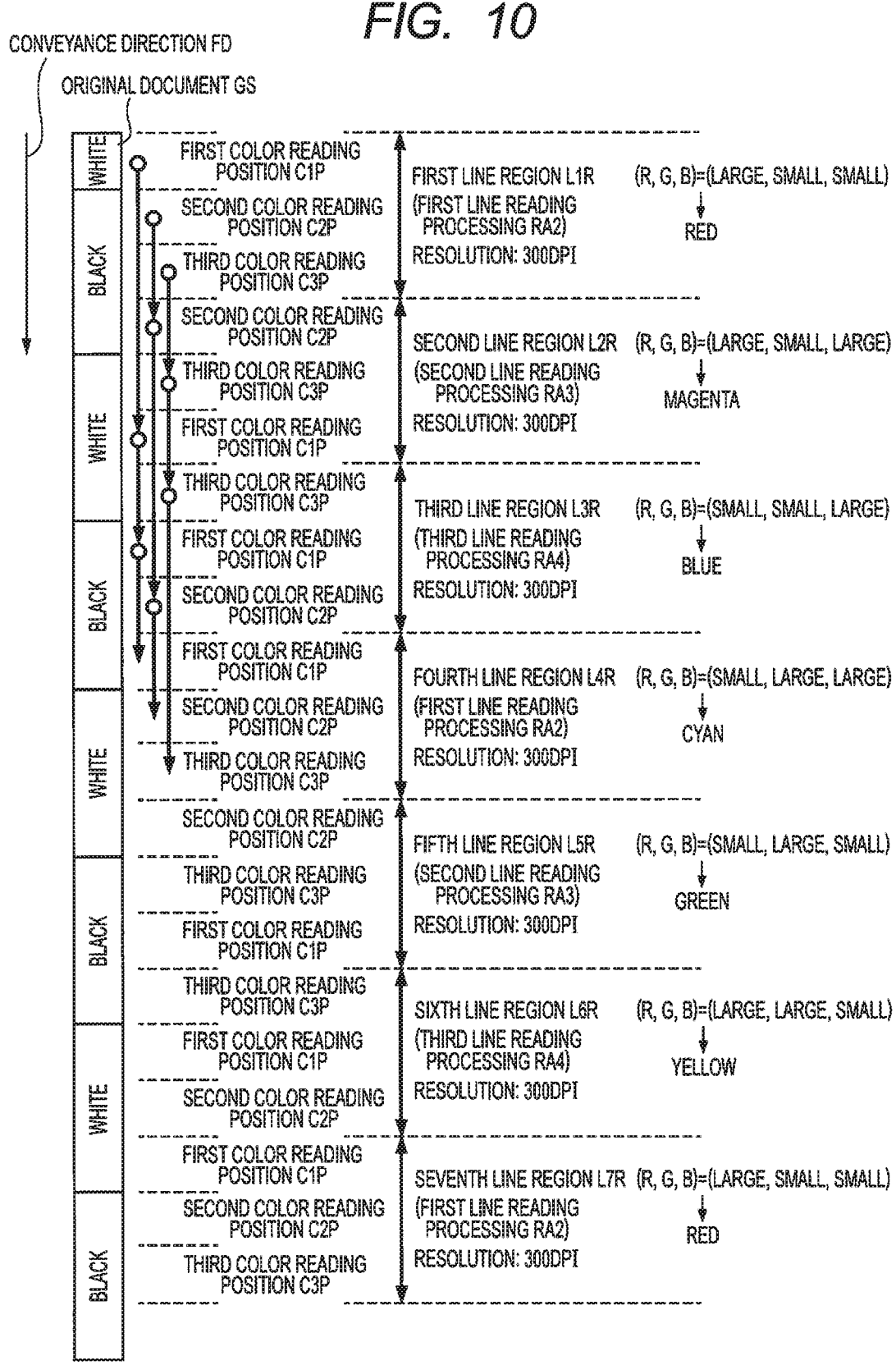
FIG. 10 is an explanatory diagram for illustrating a process in which the image scanner 1 of the first embodiment reads from a first line region L1R to a seventh line region L7R of an original document GS.

With reference to FIG. 10, descriptions are provided for a case where the image scanner 1 according to a first embodiment reads an image on the original document GS in which white color and black color are arranged at a dot interval corresponding to the reading interval at 300 DPI in the conveyance direction FD. In this example, particular pixels in the main scanning direction MD are read. As shown in FIG. 10, in the original document GS of this example, an upstream-side one third (⅓) of a first line region L1R in the conveyance direction FD is white color. The first line region L1R is read in the first line reading processing RA2 that is executed for the first time. From the white region toward the downstream side in the conveyance direction FD, a white image and a black image are arranged alternately and adjacent to each other at a dot interval corresponding to the reading interval at 300 DPI.

The image scanner 1 reads an image in the first line region L1R of the original document GS in the first line reading processing RA2 that is executed for the first time. The image scanner 1 reads a white image at a first color reading position C1P in the first line region L1R in the first color reading processing RB1. The image scanner 1 reads a black image at a second color reading position C2P in the first line region L1R in the second color reading processing RB2. The image scanner 1 reads a black image at a third color reading position C3P in the first line region L1R in the third color reading processing RB3. Therefore, red digital image data that is digital image data of the first color has a large output value because red light is reflected by the white image. Green digital image data that is digital image data of the second color has a small output value because green light is absorbed by the black image. Blue digital image data that is digital image data of the third color has a small output value because blue light is absorbed by the black image. One-line digital image data in the first line region L1R formed by combining the above-described digital image data has red color, since the one-line digital image data has a large output value for red, a small output value for green, and a small output value for blue.

The image scanner 1 reads an image in a second line region L2R of the original document GS in the second line reading processing RA3 that is executed for the first time. The image scanner 1 reads a black image at the second color reading position C2P in the second line region L2R in the second color reading processing RC1. The image scanner 1 reads a white image at the third color reading position C3P in the second line region L2R in the third color reading processing RC2. The image scanner 1 reads a white image at the first color reading position C1P in the second line region L2R in the first color reading processing RC3. Therefore, green digital image data that is digital image data of the second color has a small output value because green light is absorbed by the black image. Blue digital image data that is digital image data of the third color has a large output value because blue light is reflected by the white image. Red digital image data that is digital image data of the first color has a large output value because red light is reflected by the white image. One-line digital image data in the second line region L2R formed by combining the above-described digital image data has magenta color, since the one-line digital image data has a large output value for red, a small output value for green, and a large output value for blue.

The image scanner 1 reads an image in a third line region L3R of the original document GS in the third line reading processing RA4 that is executed for the first time. The image scanner 1 reads a white image at the third color reading position C3P in the third line region L3R in the third color reading processing RD1. The image scanner 1 reads a black image at the first color reading position C1P in the third line region L3R in the first color reading processing RD2. The image scanner 1 reads a black image at the second color reading position C2P in the third line region L3R in the second color reading processing RD3. Therefore, blue digital image data that is digital image data of the third color has a large output value because blue light is reflected by the white image. Red digital image data that is digital image data of the first color has a small output value because red light is absorbed by the black image. Green digital image data that is digital image data of the second color has a small output value because green light is absorbed by the black image. One-line digital image data in the third line region L3R formed by combining the above-described digital image data has blue color, since the one-line digital image data has a small output value for red, a small output value for green, and a large output value for blue.

The image scanner 1 reads an image in a fourth line region L4R of the original document GS in the first line reading processing RA2 that is executed for the second time. The image scanner 1 reads a black image at the first color reading position C1P in the fourth line region L4R in the first color reading processing RB1. The image scanner 1 reads a white image at the second color reading position C2P in the fourth line region L4R in the second color reading processing RB2. The image scanner 1 reads a white image at the third color reading position C3P in the fourth line region L4R in the third color reading processing RB3. Therefore, red digital image data that is digital image data of the first color has a small output value because red light is absorbed by the black image. Green digital image data that is digital image data of the second color has a large output value because green light is reflected by the white image. Blue digital image data that is digital image data of the third color has a large output value because blue light is reflected by the white image. One-line digital image data in the fourth line region L4R formed by combining the above-described digital image data has cyan color, since the one-line digital image data has a small output value for red, a large output value for green, and a large output value for blue.

The image scanner 1 reads an image in a fifth line region L5R of the original document GS in the second line reading processing RA3 that is executed for the second time. The image scanner 1 reads a white image at the second color reading position C2P in the fifth line region L5R in the second color reading processing RC1. The image scanner 1 reads a black image at the third color reading position C3P in the fifth line region L5R in the third color reading processing RC2. The image scanner 1 reads a black image at the first color reading position C1P in the fifth line region L5R in the first color reading processing RC3. Therefore, green digital image data that is digital image data of the second color has a large output value because green light is reflected by the white image. Blue digital image data that is digital image data of the third color has a small output value because blue light is absorbed by the black image. Red digital image data that is digital image data of the first color has a small output value because red light is absorbed by the black image. One-line digital image data in the fifth line region L5R formed by combining the above-described digital image data has green color, since the one-line digital image data has a small output value for red, a large output value for green, and a small output value for blue.

The image scanner 1 reads an image in a sixth line region L6R of the original document GS in the third line reading processing RA4 that is executed for the second time. The image scanner 1 reads a black image at the third color reading position C3P in the sixth line region L6R in the third color reading processing RD1. The image scanner 1 reads a white image at the first color reading position C1P in the sixth line region L6R in the first color reading processing RD2. The image scanner 1 reads a white image at the second color reading position C2P in the sixth line region L6R in the second color reading processing RD3. Therefore, blue digital image data that is digital image data of the third color has a small output value because blue light is absorbed by the black image. Red digital image data that is digital image data of the first color has a large output value because red light is reflected by the white image. Green digital image data that is digital image data of the second color has a large output value because green light is reflected by the white image. One-line digital image data in the fourth line region L4R formed by combining the above-described digital image data has yellow color, since the one-line digital image data has a large output value for red, a large output value for green, and a small output value for blue.

The image scanner 1 reads an image in a seventh line region L7R of the original document GS in the first line reading processing RA2 that is executed for the third time. The image scanner 1 reads a white image at the first color reading position C1P in the seventh line region L7R in the first color reading processing RB1. The image scanner 1 reads a black image at the second color reading position C2P in the seventh line region L7R in the second color reading processing RB2. The image scanner 1 reads a black image at the third color reading position C3P in the seventh line region L7R in the third color reading processing RB3. Therefore, red digital image data that is digital image data of the first color has a large output value because red light is reflected by the white image. Green digital image data that is digital image data of the second color has a small output value because green light is absorbed by the black image. Blue digital image data that is digital image data of the third color has a small output value because blue light is absorbed by the black image. One-line digital image data in the seventh line region L7R formed by combining the above-described digital image data has red color, since the one-line digital image data has a large output value for red, a small output value for green, and a small output value for blue. In this way, one-line digital image data in the seventh line region L7R and one-line digital image data in the first line region L1R have the same red digital image data when the same first line reading processing RA2 is executed. Thus, one-line digital image data from the first line region L1R to the sixth line region L6R is repeatedly output in regions after the seventh line region L7R.

The interval between the first color reading position C1P in the first line region L1R and the first color reading position C1P in the second line region L2R is a distance that is 5/3 times the reading interval at 300 DPI which is the reading resolution in the conveyance direction FD. The interval between the first color reading position C1P in the second line region L2R and the first color reading position C1P in the third line region L3R is a distance that is ⅔ times the reading interval at 300 DPI which is the reading resolution in the conveyance direction FD. The interval between the first color reading position C1P in the third line region L3R and the first color reading position C1P in the fourth line region L4R is a distance that is ⅔ times the reading interval at 300 DPI which is the reading resolution in the conveyance direction FD. Therefore, the interval between first color reading positions C1P is always different from the reading interval at 300 DPI which is the reading resolution in the conveyance direction FD.

The interval between the second color reading position C2P in the first line region L1R and the second color reading position C2P in the second line region L2R is a distance that is ⅔ times the reading interval at 300 DPI which is the reading resolution in the conveyance direction FD. The interval between the second color reading position C2P in the second line region L2R and the second color reading position C2P in the third line region L3R is a distance that is 5/3 times the reading interval at 300 DPI which is the reading resolution in the conveyance direction FD. The interval between the second color reading position C2P in the third line region L3R and the second color reading position C2P in the fourth line region L4R is a distance that is ⅔ times the reading interval at 300 DPI which is the reading resolution in the conveyance direction FD. Therefore, the interval between second color reading positions C2P is always different from the reading interval at 300 DPI which is the reading resolution in the conveyance direction FD.

The interval between the third color reading position C3P in the first line region L1R and the third color reading position C3P in the second line region L2R is a distance that is ⅔ times the reading interval at 300 DPI which is the reading resolution in the conveyance direction FD. The interval between the third color reading position C3P in the second line region L2R and the third color reading position C3P in the third line region L3R is a distance that is ⅔ times the reading interval at 300 DPI which is the reading resolution in the conveyance direction FD. The interval between the third color reading position C3P in the third line region L3R and the third color reading position C3P in the fourth line region L4R is a distance that is 5/3 times the reading interval at 300 DPI which is the reading resolution in the conveyance direction FD. Therefore, the interval between third color reading positions C3P is always different from the reading interval at 300 DPI which is the reading resolution in the conveyance direction FD.

All of the intervals between the first color reading positions C1P, the intervals between the second color reading positions C2P, and the intervals between the third color reading positions C3P are different from the reading interval at 300 DPI which is the reading resolution in the conveyance direction FD. As described above, the color of the digital image data from the first line region L1R to the seventh line region L7R gradually changes from red, magenta, blue, cyan, green, yellow and back to red. In other words, the color of the digital image data from the first line region L1R to the seventh line region L7R changes so as to gradually rotate in one direction on a hue circle and return to the original color. Therefore, when reading a dotted original document having a dot interval that is the same as the reading interval at 300 DPI which is the reading resolution in the conveyance direction FD, reading is performed while the colors of all of the hues gradually change. Thus, the original document can be read without appearing to have a particular color.

Second Embodiment

A second embodiment of this disclosure will be described. The mechanical configuration and electrical configuration of the second embodiment are the same as those of the first embodiment, and thus descriptions thereof are omitted. The operations of an image scanner of the second embodiment will be described below.

<Operation of Image Scanner in Second Embodiment>

Next, the operation of the image scanner 1 in the second embodiment will be described with reference to the accompanying drawings. Descriptions for similar parts of operations to the first embodiment will be omitted, and only different parts of operations from the first embodiment will be described. The changes from the first embodiment to the second embodiment are as follows. The processing RC1 to the processing RC3 of the second line reading processing (RA3) in the first embodiment is changed to processing RE1 to processing RE3 of second line reading processing (RA3-1) in the second embodiment. Further, the processing RD1 to the processing RD3 of the third line reading processing (RA4) in the first embodiment is changed to processing RF1 to processing RF3 of third line reading processing (RA4-1) in the second embodiment. The other processing is the same as the processing in the first embodiment, and descriptions thereof are omitted.

<Second Line Reading Processing RA3-1>

Upon starting the second line reading processing RA3-1 shown in FIG. 11, the CPU 40 executes the third color reading processing (RE1). More specifically, the CPU 40 controls the device controller 44 to emit light of a third color from the light source 30 to the original document GS and acquires digital image data of the third color by reading the light reflected from the original document GS. In this embodiment, as in the first embodiment, the light of the third color is blue light.

The CPU 40 executes the first color reading processing (RE2). More specifically, the CPU 40 controls the device controller 44 to emit light of a first color from the light source 30 to the original document GS and acquires digital image data of the first color by reading the light reflected from the original document GS. In this embodiment, as in the first embodiment, the light of the first color is red light.

The CPU 40 executes the second color reading processing (RE3). More specifically, the CPU 40 controls the device controller 44 to emit light of a second color from the light source 30 to the original document GS and acquires digital image data of the second color by reading the light reflected from the original document GS. When the processing RE3 ends, the processing RA3-1 ends. In this embodiment, as in the first embodiment, the light of the second color is green light. The digital image data of the third color acquired in the processing RE1, the digital image data of the first color acquired in the processing RE2, and the digital image data of the second color acquired in the processing RE3 are combined to form the digital image data of one line.

<Third Line Reading Processing RA4-1>

Upon starting the third line reading processing RA4-1 shown in FIG. 12, the CPU 40 executes the second color reading processing (RF1). More specifically, the CPU 40 controls the device controller 44 to emit light of the second color from the light source 30 to the original document GS and acquires digital image data of the second color by reading the light reflected from the original document GS. In this embodiment, the light of the second color is green light as mentioned above.

The CPU 40 executes the third color reading processing (RF2). More specifically, the CPU 40 controls the device controller 44 to emit light of the third color from the light source 30 to the original document GS and acquires digital image data of the third color by reading the light reflected from the original document GS. In this embodiment, the light of the third color is blue light as mentioned above.

The CPU 40 executes the first color reading processing (RF3). More specifically, the CPU 40 controls the device controller 44 to emit light of the first color from the light source 30 to the original document GS and acquires digital image data of the first color by reading the light reflected from the original document GS. When the processing RF3 ends, the processing RA4-1 ends. In this embodiment, the light of the first color is red light as mentioned above. The digital image data of the second color acquired in the processing RF1, the digital image data of the third color acquired in the processing RF2, and the digital image data of the first color acquired in the processing RF3 are combined to form the digital image data of one line.

Specific Example of Second Embodiment

Figure 13:
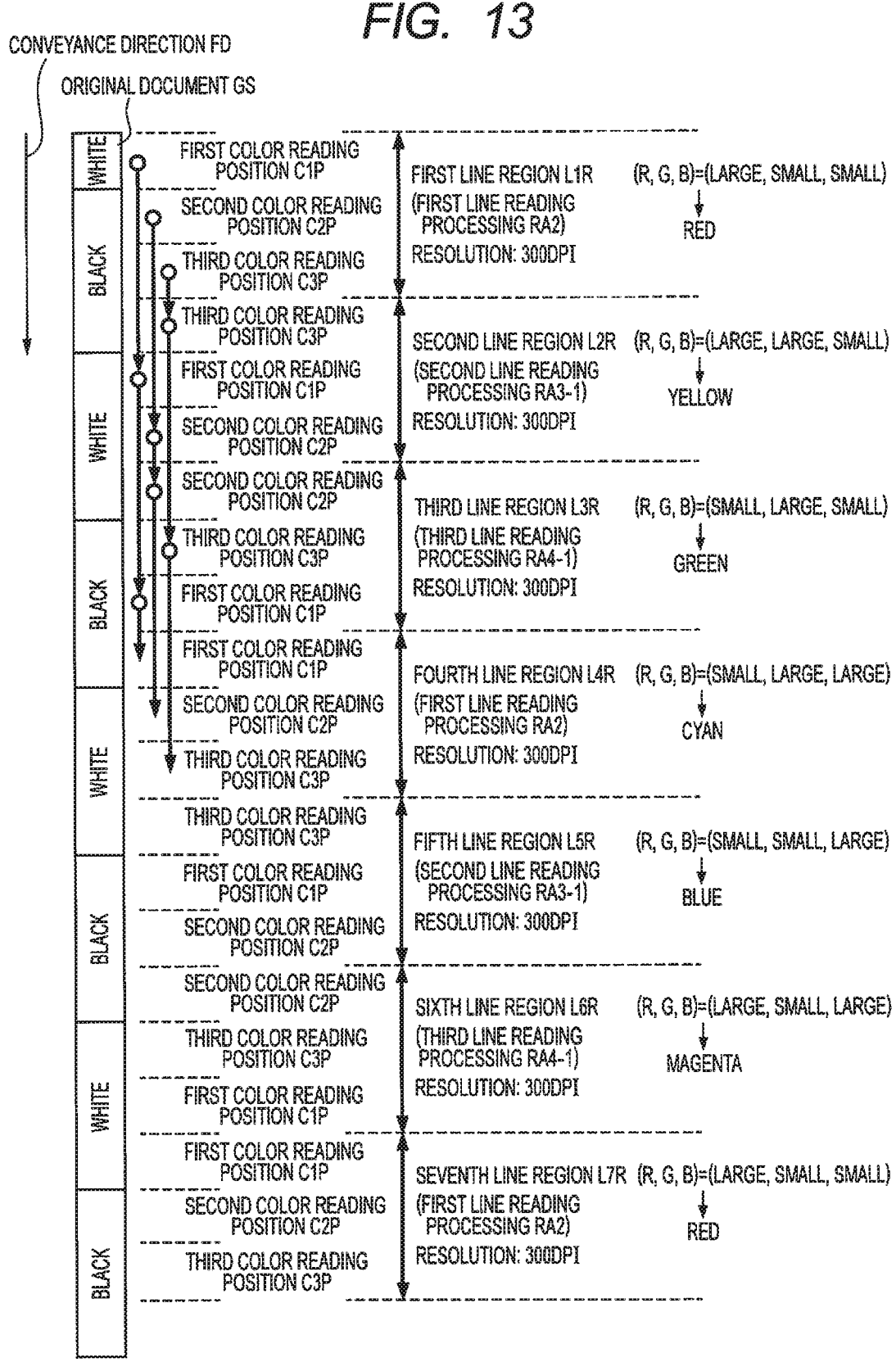
FIG. 13 is an explanatory diagram for illustrating a process in which the image scanner 1 of the second embodiment reads from a first line region L1R to a seventh line region L7R of an original document GS.

A specific example of the second embodiment will be described with reference to FIG. 13. An image on the original document GS to be read by the image scanner 1 is the same as the image of the first embodiment shown in FIG. 10.

The image scanner 1 reads an image in the first line region L1R of the original document GS in the first line reading processing RA2 that is executed for the first time. The image scanner 1 reads a white image at the first color reading position C1P in the first line region L1R in the first color reading processing RB1. The image scanner 1 reads a black image at the second color reading position C2P in the first line region L1R in the second color reading processing RB2. The image scanner 1 reads a black image at the third color reading position C3P in the first line region L1R in the third color reading processing RB3. Therefore, red digital image data that is digital image data of the first color has a large output value because red light is reflected by the white image. Green digital image data that is digital image data of the second color has a small output value because green light is absorbed by the black image. Blue digital image data that is digital image data of the third color has a small output value because blue light is absorbed by the black image. One-line digital image data in the first line region L1R formed by combining the above-described digital image data has red color, since the one-line digital image data has a large output value for red, a small output value for green, and a small output value for blue.

The image scanner 1 reads an image in the second line region L2R of the original document GS in second line reading processing RA3-1 that is executed for the first time. The image scanner 1 reads a black image at the third color reading position C3P in the second line region L2R in the third color reading processing RE1. The image scanner 1 reads a white image at the first color reading position C1P in the second line region L2R in the first color reading processing RE2. The image scanner 1 reads a white image at the second color reading position C2P in the second line region L2R in the second color reading processing RE3. Therefore, blue digital image data that is digital image data of the third color has a small output value because blue light is absorbed by the black image. Red digital image data that is digital image data of the first color has a large output value because red light is reflected by the white image. Green digital image data that is digital image data of the second color has a large output value because green light is reflected by the white image. One-line digital image data in the second line region L2R formed by combining the above-described digital image data has yellow color, since the one-line digital image data has a large output value for red, a large output value for green, and a small output value for blue.

The image scanner 1 reads an image in the third line region L3R of the original document GS in third line reading processing RA4-1 that is executed for the first time. The image scanner 1 reads a white image at the second color reading position C2P in the third line region L3R in the second color reading processing RF1. The image scanner 1 reads a black image at the third color reading position C3P in the third line region L3R in the third color reading processing RF2. The image scanner 1 reads a black image at the first color reading position C1P in the third line region L3R in the first color reading processing RF3. Therefore, green digital image data that is digital image data of the second color has a large output value because green light is reflected by the white image. Blue digital image data that is digital image data of the third color has a small output value because blue light is absorbed by the black image. Red digital image data that is digital image data of the first color has a small output value because red light is absorbed by the black image. One-line digital image data in the third line region L3R formed by combining the above-described digital image data has green color, since the one-line digital image data has a small output value for red, a large output value for green, and a small output value for blue.

The image scanner 1 reads an image in the fourth line region L4R of the original document GS in first line reading processing RA2 that is executed for the second time. The image scanner 1 reads a black image at the first color reading position C1P in the fourth line region L4R in the first color reading processing RB1. The image scanner 1 reads a white image at the second color reading position C2P in the fourth line region L4R in the second color reading processing RB2. The image scanner 1 reads a white image at the third color reading position C3P in the fourth line region L4R in the third color reading processing RB3. Therefore, red digital image data that is digital image data of the first color has a small output value because red light is absorbed by the black image. Green digital image data that is digital image data of the second color has a large output value because green light is reflected by the white image. Blue digital image data that is digital image data of the third color has a large output value because blue light is reflected by the white image. One-line digital image data in the fourth line region L4R formed by combining the above-described digital image data has cyan color, since the one-line digital image data has a small output value for red, a large output value for green, and a large output value for blue.

The image scanner 1 reads an image in the fifth line region L5R of the original document GS in second line reading processing RA3-1 that is executed for the second time. The image scanner 1 reads a white image at the third color reading position C3P in the fifth line region L5R in the third color reading processing RE1. The image scanner 1 reads a black image at the first color reading position C1P in the fifth line region L5R in the first color reading processing RE2. The image scanner 1 reads a black image at the second color reading position C2P in the fifth line region L5R in the second color reading processing RE3. Therefore, blue digital image data that is digital image data of the third color has a large output value because blue light is reflected by the white image. Red digital image data that is digital image data of the first color has a small output value because red light is absorbed by the black image. Green digital image data that is digital image data of the second color has a small output value because green light is absorbed by the black image. One-line digital image data in the fifth line region L5R formed by combining the above-described digital image data has blue color, since the one-line digital image data has a small output value for red, a small output value for green, and a large output value for blue.

The image scanner 1 reads an image in the sixth line region L6R of the original document GS in third line reading processing RA4-1 that is executed for the second time. The image scanner 1 reads a black image at the second color reading position C2P in the sixth line region L6R in the second color reading processing RF1. The image scanner 1 reads a white image at the third color reading position C3P in the sixth line region L6R in the third color reading processing RF2. The image scanner 1 reads a white image at the first color reading position C1P in the sixth line region L6R in the first color reading processing RF3. Therefore, green digital image data that is digital image data of the second color has a small output value because green light is absorbed by the black image. Blue digital image data that is digital image data of the third color has a large output value because blue light is reflected by the white image. Red digital image data that is digital image data of the third color has a large output value because red light is reflected by the white image. One-line digital image data in the sixth line region L6R formed by combining the above-described digital image data has magenta color, since the one-line digital image data has a large output value for red, a small output value for green, and a large output value for blue.

The image scanner 1 reads an image in the seventh line region L7R of the original document GS in first line reading processing RA2 that is executed for the third time. The image scanner 1 reads a white image at the first color reading position C1P in the seventh line region L7R in the first color reading processing RB1. The image scanner 1 reads a black image at the second color reading position C2P in the seventh line region L7R in the second color reading processing RB2. The image scanner 1 reads a black image at the third color reading position C3P in the seventh line region L7R in the third color reading processing RB3. Therefore, red digital image data that is digital image data of the first color has a large output value because red light is reflected by the white image. Green digital image data that is digital image data of the second color has a small output value because green light is absorbed by the black image. Blue digital image data that is digital image data of the third color has a small output value because blue light is absorbed by the black image. One-line digital image data in the seventh line region L7R formed by combining the above-described digital image data has red color, since the one-line digital image data has a large output value for red, a small output value for green, and a small output value for blue. In this way, one-line digital image data in the seventh line region L7R and one-line digital image data in the first line region L1R have the same red digital image data when the same first line reading processing RA2 is executed. Thus, one-line digital image data from the first line region L1R to the sixth line region L6R is repeatedly output in regions after the seventh line region L7R.

The interval between the first color reading position C1P in the first line region L1R and the first color reading position C1P in the second line region L2R is a distance that is 4/3 times the reading interval at 300 DPI which is the reading resolution in the conveyance direction FD. The interval between the first color reading position C1P in the second line region L2R and the first color reading position C1P in the third line region L3R is a distance that is 4/3 times the reading interval at 300 DPI which is the reading resolution in the conveyance direction FD. The interval between the first color reading position C1P in the third line region L3R and the first color reading position C1P in the fourth line region L4R is a distance that is ⅓ times the reading interval at 300 DPI which is the reading resolution in the conveyance direction FD. Therefore, the interval between the first color reading positions C1P is always different from the reading interval at 300 DPI which is the reading resolution in the conveyance direction FD.

The interval between the second color reading position C2P in the first line region L1R and the second color reading position C2P in the second line region L2R is a distance that is 4/3 times the reading interval at 300 DPI which is the reading resolution in the conveyance direction FD. The interval between the second color reading position C2P in the second line region L2R and the second color reading position C2P in the third line region L3R is a distance that is ⅓ times the reading interval at 300 DPI which is the reading resolution in the conveyance direction FD. The interval between the second color reading position C2P in the third line region L3R and the second color reading position C2P in the fourth line region L4R is a distance that is 4/3 times the reading interval at 300 DPI which is the reading resolution in the conveyance direction FD. Therefore, the interval between the second color reading positions C2P is always different from the reading interval at 300 DPI which is the reading resolution in the conveyance direction FD.

The interval between the third color reading position C3P in the first line region L1R and the third color reading position C3P in the second line region L2R is a distance that is ⅓ times the reading interval at 300 DPI which is the reading resolution in the conveyance direction FD. The interval between the third color reading position C3P in the second line region L2R and the third color reading position C3P in the third line region L3R is a distance that is 4/3 times the reading interval at 300 DPI which is the reading resolution in the conveyance direction FD. The interval between the third color reading position C3P in the third line region L3R and the third color reading position C3P in the fourth line region L4R is a distance that is 4/3 times the reading interval at 300 DPI which is the reading resolution in the conveyance direction FD. Therefore, the interval between the third color reading positions C3P is always different from the reading interval at 300 DPI which is the reading resolution in the conveyance direction FD.

All of the intervals between the first color reading positions C1P, the intervals between the second color reading positions C2P, and the intervals between the third color reading positions C3P are different from the reading interval at 300 DPI which is the reading interval in the conveyance direction FD. As described above, the color of the digital image data from the first line region L1R to the seventh line region L7R gradually changes from red, yellow, green, cyan, blue, magenta and back to red. In other words, the color of the digital image data from the first line region L1R to the seventh line region L7R changes so as to gradually rotate in one direction (the opposite direction from the direction in the first embodiment) on a hue circle and return to the original color. Therefore, when reading a dotted original document having a dot interval that is the same as the reading interval at 300 DPI which is the reading resolution in the conveyance direction FD, reading is performed while the colors of all of the hues gradually change. Thus, the original document can be read without appearing to have a particular color.

Effects of Embodiments

In the first embodiment, in the line reading processing R3, if the line count value LCV is "1", the first line reading processing RA2 is executed. If the line count value LCV is "2", the second line reading processing RA3 is executed. If the line count value LCV is "3", the third line reading processing RA4 is executed. When the processing RA2 or the processing RA3 ends, the line reading processing R3 adds "1" to the line count value LCV and, when the processing RA4 ends, the line reading processing R3 sets the line count value LCV to "1". In the first line reading processing RA2, the first color reading processing RB1, the second color reading processing RB2, then the third color reading processing RB3 is executed. In the second line reading processing RA3, the second color reading processing RC1, the third color reading processing RC2, then the first color reading processing RC3 is executed. In the third line reading processing RA4, the third color reading processing RD1, the first color reading processing RD2, then the second color reading processing RD3 is executed. Therefore, even when reading an original document in which the dot interval between dots and the reading interval in the conveyance direction FD are close enough such that coloring to a particular color occurs, occurrence of coloring to a particular color can be suppressed.

In the second embodiment, in the first line reading processing RA2, the first color reading processing RB1, the second color reading processing RB2, then the third color reading processing RB3 is executed. In the second line reading processing RA3-1, the third color reading processing RE1, the first color reading processing RE2, then the second color reading processing RE3 is executed. In the third line reading processing RA4-1, the second color reading processing RF1, the third color reading processing RF2, then the first color reading processing RF3 is executed. Therefore, even when reading an original document in which the dot interval between dots and the reading interval in the conveyance direction FD are close enough such that coloring to a particular color occurs, occurrence of coloring to a particular color can be suppressed.

The paper feed roller 21, the conveyance rollers 23, 26, the driving circuit 47, and the conveyance motor MT are a non-limiting example of a mover. The light receiver 31, the AFE 45, and the image processor 46 are a non-limiting example of a reader. The CPU 40 is a non-limiting example of a circuit.

The processing RA2 is a non-limiting example of first line reading processing. The processing RA3 or RA3-1 is a non-limiting example of second line reading processing. The processing RA4 or RA4-1 is a non-limiting example of third line reading processing. The processing RB1 is a non-limiting example of first color reading processing. The processing RB2 is a non-limiting example of second color reading processing. The processing RB3 is a non-limiting example of third color reading processing. The processing RC1 or RE1 is a non-limiting example of fourth color reading processing. The processing RC2 or RE2 is a non-limiting example of fifth color reading processing. The processing RC3 or RE3 is a non-limiting example of sixth color reading processing. The processing RD1 or RF1 is a non-limiting example of seventh color reading processing. The processing RD2 or RF2 is a non-limiting example of eighth color reading processing. The processing RD3 or RF3 is a non-limiting example of ninth color reading processing.

While the disclosure has been described in detail with reference to the above aspects thereof, it would be apparent to those skilled in the art that various changes and modifications may be made therein without departing from the scope of the claims.

(1) For example, the image scanner 1 may be applied to a multi-function peripheral that includes a printer unit. Further, in the above-described embodiments, one reader 24 and one white reference plate 34 are provided. Alternatively, two readers and two white reference plates may be provided in order to read both sides of an original document GS.

(2) In the above-described embodiments, the image scanner 1 is configured to convey and read the original document GS (an ADF type scanner). The image scanner 1 may be configured in another way. For example, a reader may be configured to move to read the original document GS supported on a transparent document table (a flatbed type scanner).

(3) In the above-described embodiments, the reader 24 is a reader of a non-magnification optical system that uses the rod lens array 32. Alternatively, the reader 24 may be of a reduction optical system. In this case, the reader of the reduction optical system performs a color reading operating by sequentially switching between red, green, and blue light.

What is claimed is:

1. An image scanner comprising:

a light source configured to emit light of each of three colors of red, blue, and green;

a line sensor extending in a main scanning direction and configured to read reflection light of the light of each color emitted from the light source, the line sensor comprising a plurality of photoelectric conversion elements arranged linearly in the main scanning direction;

a conveyance motor configured to change a relative position of the line sensor relative to an original document in a sub-scanning direction perpendicular to the main scanning direction; and a circuit configured to repeat a set of first line reading processing, second line reading processing, and third line reading processing, the first line reading processing, the second line reading processing, and the third line reading processing being performed in this order in each set, the first line reading processing being processing of sequentially emitting, from the light source, light of each of the three colors to a first position, a second position, and a third position in a first line of the original document in a first lighting order and reading, with the line sensor, reflection light of the light of each color emitted in the first lighting order, and combining image data of the reflection light of the light of each color of the three colors to obtain image data of the first line, the first line being a particular line of the original document, the first line corresponding to a group of pixels arranged linearly in the main scanning direction, the second position being located downstream of the first position in the sub-scanning direction, the third position being located downstream of the second position in the sub-scanning direction;

the second line reading processing being processing of sequentially emitting, from the light source, light of each of the three colors to a fourth position, a fifth position, and a sixth position in a second line of the original document in a second lighting order and reading, with the line sensor, reflection light of the light of each color emitted in the second lighting order, and combining image data of the reflection light of the light of each color of the three colors to obtain image data of the second line, the second line being located completely downstream of the first line and adjacent thereto in the sub-scanning direction, the second line corresponding to a group of pixels arranged linearly in the main scanning direction, the fifth position being located downstream of the fourth position in the sub-scanning direction, the sixth position being located downstream of the fifth position in the sub-scanning direction; and the third line reading processing being processing of sequentially emitting, from the light source, light of each of the three colors to a seventh position, an eighth position, and a ninth position in a third line of the original document in a third lighting order and reading, with the line sensor, reflection light of the light of each color emitted in the third lighting order, and combining image data of the reflection light of the light of each color of the three colors to obtain image data of the third line, the third line being located completely downstream of the second line and adjacent thereto in the sub-scanning direction, the third line corresponding to a group of pixels arranged linearly in the main scanning direction, the eighth position being located downstream of the seventh position in the sub-scanning direction, the ninth position being located downstream of the eighth position in the sub-scanning direction, a color that is first in the first lighting order, a color that is first in the second lighting order, and a color that is first in the third lighting order being different from each other, a color that is second in the first lighting order, a color that is second in the second lighting order, and a color that is second in the third lighting order being different from each other, and a color that is third in the first lighting order, a color that is third in the second lighting order, and a color that is third in the third lighting order being different from each other.

2. The image scanner according to claim 1, wherein the first line reading processing comprises:

first color reading processing of, in response to starting the first line reading processing, emitting light of a first color from the light source and reading reflection light of the light of the first color with the line sensor, the first color being one of the three colors;

second color reading processing of, in response to ending the first color reading processing, emitting light of a second color from the light source and reading reflection light of the light of the second color with the line sensor, the second color being one of two colors that are obtained by excluding the first color from the three colors; and third color reading processing of, in response to ending the second color reading processing, emitting light of a third color from the light source and reading reflection light of the light of the third color with the line sensor, the third color being a remaining color that is obtained by excluding the first color and the second color from the three colors;

wherein the second line reading processing comprises:

fourth color reading processing of, in response to starting the second line reading processing, emitting light of the second color from the light source and reading reflection light of the light of the second color with the line sensor;

fifth color reading processing of, in response to ending the fourth color reading processing, emitting light of the third color from the light source and reading reflection light of the light of the third color with the line sensor; and sixth color reading processing of, in response to ending the fifth color reading processing, emitting light of the first color from the light source and reading reflection light of the light of the first color with the line sensor; and wherein the third line reading processing comprises:

seventh color reading processing of, in response to starting the third line reading processing, emitting light of the third color from the light source and reading reflection light of the light of the third color with the line sensor;

eighth color reading processing of, in response to ending the seventh color reading processing, emitting light of the first color from the light source and reading reflection light of the light of the first color with the line sensor; and ninth color reading processing of, in response to ending the eighth color reading processing, emitting light of the second color from the light source and reading reflection light of the light of the second color with the line sensor.

3. The image scanner according to claim 1, wherein the first line reading processing comprises:
   first color reading processing of, in response to starting the first line reading processing, emitting light of a first color from the light source and reading reflection light of the light of the first color with the line sensor, the first color being one of the three colors;
   second color reading processing of, in response to ending the first color reading processing, emitting light of a second color from the light source and reading reflection light of the light of the second color with the line sensor, the second color being one of two colors that are obtained by excluding the first color from the three colors; and
   third color reading processing of, in response to ending the second color reading processing, emitting light of a third color from the light source and reading reflection light of the light of the third color with the line sensor, the third color being a remaining color that is obtained by excluding the first color and the second color from the three colors;
   wherein the second line reading processing comprises:
   fourth color reading processing of, in response to starting the second line reading processing, emitting light of the third color from the light source and reading reflection light of the light of the third color with the line sensor;
   fifth color reading processing of, in response to ending the fourth color reading processing, emitting light of the first color from the light source and reading reflection light of the light of the first color with the line sensor; and
   sixth color reading processing of, in response to ending the fifth color reading processing, emitting light of the second color from the light source and reading reflection light of the light of the second color with the line sensor; and
   wherein the third line reading processing comprises:
   seventh color reading processing of, in response to starting the third line reading processing, emitting light of the second color from the light source and reading reflection light of the light of the second color with the line sensor;
   eighth color reading processing of, in response to ending the seventh color reading processing, emitting light of the third color from the light source and reading reflection light of the light of the third color with the line sensor; and
   ninth color reading processing of, in response to ending the eighth color reading processing, emitting light of the first color from the light source and reading reflection light of the light of the first color with the line sensor.

4. The image scanner according to claim 1, wherein an interval between a first color reading position in a certain line of the original document and a first color reading position in a subsequent line of the original document is always different from a reading interval corresponding to a reading resolution in the sub-scanning direction, the subsequent line being adjacent to the certain line at a downstream side thereof in the sub-scanning direction, the first color reading position being a position to which light of a first color is emitted from the light source and reflection light of the light of the first color is read with the line sensor, the first color being one of the three colors;
   wherein an interval between a second color reading position in the certain line and a second color reading position in the subsequent line is always different from the reading interval, the second color reading position being a position to which light of a second color is emitted from the light source and reflection light of the light of the second color is read with the line sensor, the second color being one of two colors that are obtained by excluding the first color from the three colors; and
   wherein an interval between a third color reading position in the certain line and a third color reading position in the subsequent line is always different from the reading interval, the third color reading position being a position to which light of a third color is emitted from the light source and reflection light of the light of the third color is read with the line sensor, the third color being a remaining color that is obtained by excluding the first color and the second color from the three colors.

5. The image scanner according to claim 1, wherein a first line region of the original document is read in the first line reading processing that is executed for first time, a second line region of the original document is read in the second line reading processing that is executed for first time, a third line region of the original document is read in the third line reading processing that is executed for first time, a fourth line region of the original document is read in the first line reading processing that is executed for second time, a fifth line region of the original document is read in the second line reading processing that is executed for second time, a sixth line region of the original document is read in the third line reading processing that is executed for second time, and a seventh line region of the original document is read in the first line reading processing that is executed for third time; and
   wherein, when the original document has an image in which white color and black color are arranged alternately at a dot interval corresponding to a reading interval in the sub-scanning direction, a color of digital image data obtained by reading the image from the first line region to the seventh line region changes so as to gradually rotate in one direction on a hue circle and return to an original color.

6. The image scanner according to claim 1, wherein the circuit is further configured to:
   determine an output value for each of the three colors of the image data of the first line; and
   determine a color of the first line based on a combination of the output value of each of the three colors.

* * * * *